United States Patent [19]
Wickstrom

[11] 3,943,412
[45] Mar. 9, 1976

[54] ELECTRICAL COMPONENT CONTAINER ASSEMBLY HAVING DETACHABLE INSTALLABLE CASES

[75] Inventor: Harry L. Wickstrom, Arlington Heights, Ill.

[73] Assignee: Cook Electric Company, Morton Grove, Ill.

[22] Filed: Apr. 24, 1974

[21] Appl. No.: 463,462

Related U.S. Application Data

[63] Continuation of Ser. No. 322,634, Jan. 11, 1973, abandoned.

[52] U.S. Cl. .................... 317/99; 174/52 R; 336/67
[51] Int. Cl.² ...................... H05K 5/02; H05K 7/18
[58] Field of Search ...... 248/223, 224, 225; 178/46; 174/52 R, 52 PE; 339/198 GA; 317/99, 122; 336/65, 67, 68, 96; 220/23.4, 23.6; 206/328; 191/12 R; 343/872

[56] References Cited
UNITED STATES PATENTS

| | | | |
|---|---|---|---|
| 3,272,908 | 9/1966 | Beecher | 174/52 R |
| 3,499,096 | 3/1970 | Beecher | 174/52 R |
| 3,547,274 | 12/1970 | Sosinkski | 317/99 |
| 3,691,294 | 9/1972 | Charles | 336/65 |
| 3,750,992 | 8/1973 | Johnson | 336/67 |

*Primary Examiner*—Gerald P. Tolin
*Attorney, Agent, or Firm*—Mason, Kolehmainen, Rathburn & Wyss

[57] ABSTRACT

An electrical component container assembly includes at least one receptacle or case having a generally cylindrical body portion to contain at least one electrical component, a mounting track or guide with first and second channels, and a wire guard or cover to protect or cover electrical component leads projecting from the body portion. The case has a pair of legs which extend radially from the outer periphery of the body portion and which snap or slide into the first channel of the mounting track to mount the case on the track. The body portion also has a pair of spaced and rounded projections extending longitudinally along a part of the outer periphery of the body portion. These projections are received within mounting recesses on the wire guard to detachably mount the cover or guard on the body portion. Slidably insertable into the second channel of the mounting track are appropriate mounting studs or one of a plurality of T-shaped projections on a cluster mounting bracket.

20 Claims, 8 Drawing Figures

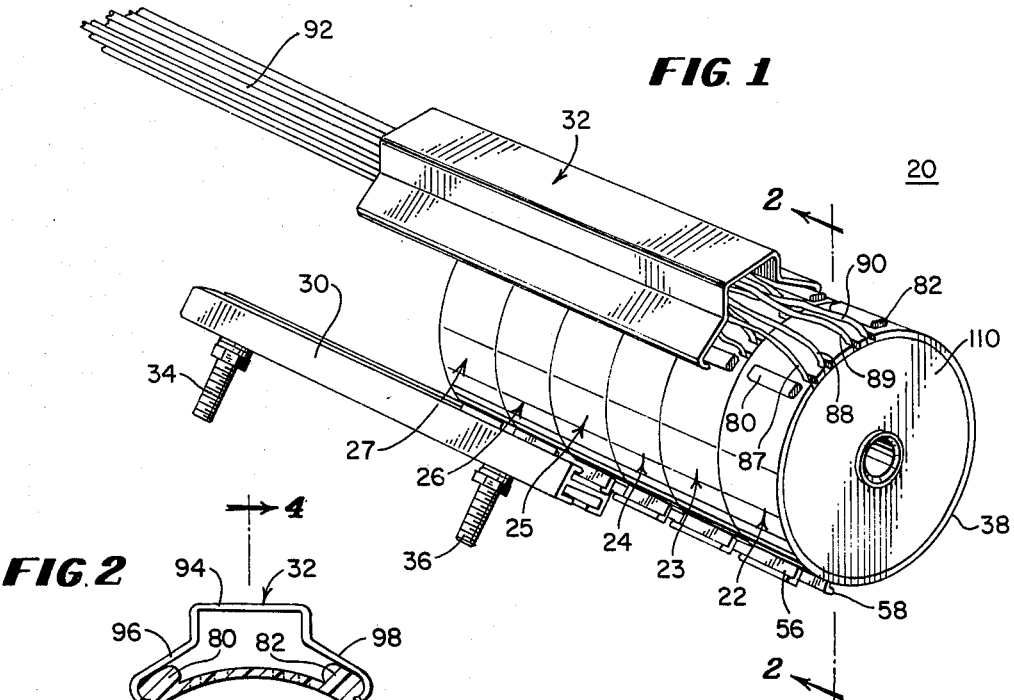
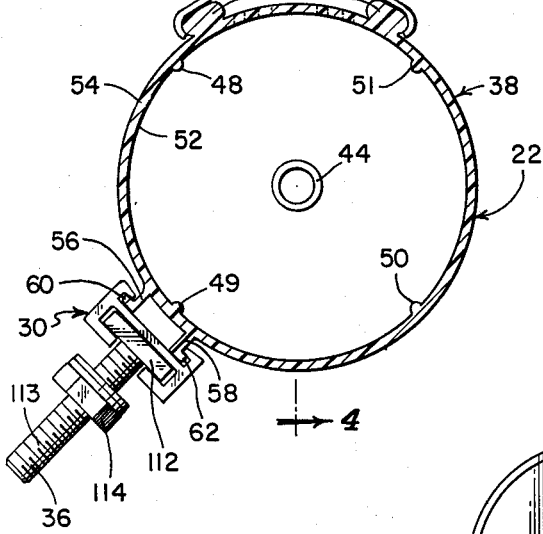
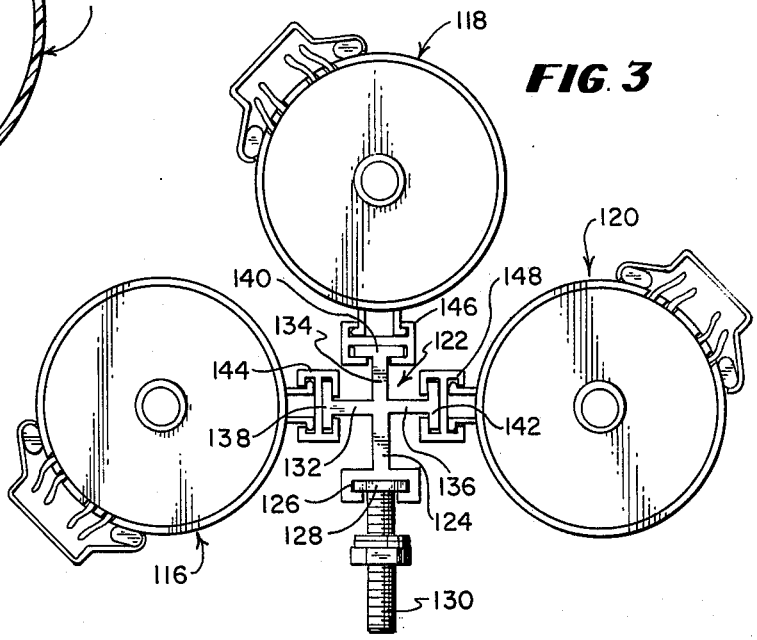

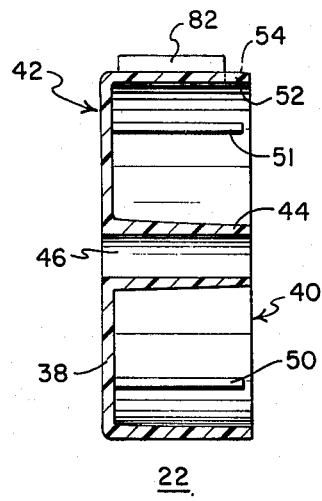
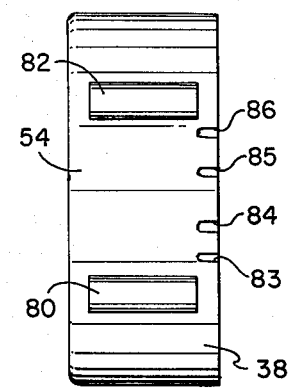
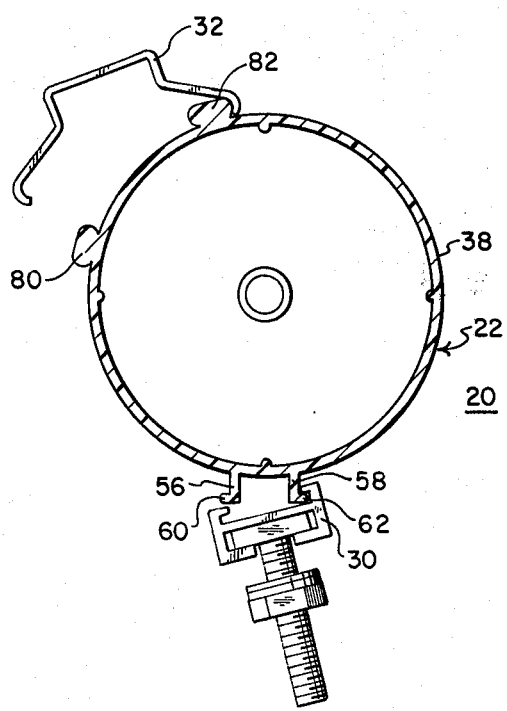
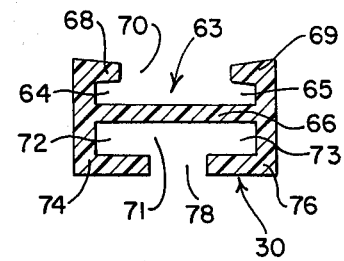
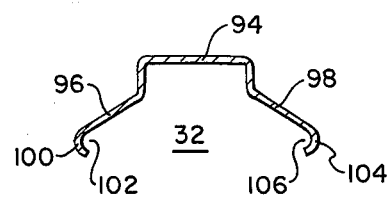

ELECTRICAL COMPONENT CONTAINER ASSEMBLY HAVING DETACHABLE INSTALLABLE CASES

The present application is a continuation application of U.S. Pat. application Ser. No. 322,634, filed on Jan. 11, 1973, and now abandoned.

This invention relates to electrical component container assemblies and, more particularly, to a new and improved receptacle or case for electrical components which snap or slide into a mounting track and on which snaps or slides a wire guard.

In order to improve the transmission characteristics of voice cables or transmission lines, such as those utilized in telephone communication systems, various electrical components, such as load coils, build out capacitors, lattice networks and the like, are coupled to the telephone lines. Under many circumstances these electrical components are located in buried cable terminal housings which offer a limited amount of space for such components and a limited amount of working space for a person coupling the components to the transmission line. In order to place an optimal number of electrical components in the limited space available for the components, a number of such electrical components can be encapsulated in rigid cases. Normally these cases are available with a specific number of electrical components therein, and cases containing different combinations or numbers of electrical components must be specially ordered. Moreover, if an individual electrical component in the unit or case becomes defective, the entire unit needs to be replaced, notwithstanding the fact that the other electrical components therein are still operative.

In order to decrease the amount of inventory of preassembled units and to allow more latitude in the number of electrical components added to or removed from such transmission lines, certain modular cases for electrical components have been developed and made commercially available. However, one form of these modular cases is not desirable in certain applications because each of the cases is interlocked with each of the adjacent cases so that it is difficult to replace one of the cases without disturbing the adjacent cases.

Modular component packages of another type, such as the type disclosed in U.S. Pat. No. 3,691,294, have an elongated case in which a number of individual electrical components are insertable. The elongated case has a longitudinally extending slot which can be pulled apart near an individual electrical component when removing the component from the case. However, these packages also suffer certain disadvantages. As an example, it is quite difficult to pull the slot apart adjacent the electrical component while at the same time extracting the component through the slot. In so doing, there is a tendency to either turn the component sideways in the case so as to disturb adjacent electrical components or pull on the leads extending from the electrical components resulting in damage to such leads.

Accordingly, one object of the present invention is to provide a new and improved electrical component container assembly.

Another object of the present invention is to provide a new and improved electrical component container assembly having individual receptacles or cases that snap or slide into a mounting track for easy installation and/or removal of any individual case without disturbing adjacent cases and without damaging the leads extending from the electrical components.

Yet another object of the present invention is to provide a new and improved electrical component container assembly in which the wire guard is detachably mountable on individual cases containing electrical components.

In accordance with these and many other objects, an embodiment of the present invention comprises an electrical component container assembly having a wire guard to protect leads extending from the electrical components, a mounting track with first and second channels, and a plurality of receptacles or cases. Each of the cases has a generally cylindrical body portion containing the electrical components with a pair of spaced and rounded projections which extend longitudinally along a portion of the outer periphery of the body portion and onto which is detachably mountable the wire guard. Also extending radially from the outer periphery of the body portion are a pair of spaced legs that detachably mount on the mounting track by snapping or sliding into the first channel. The second channel of the mounting track slidably receives appropriate mounting studs to secure the mounting track in a buried cable terminal housing or the like or slidably receives one of a plurality of projections of a cluster mounting bracket that enables a number of container assemblies to be installed in a buried cable terminal housing or the like.

Many other objects and advantages of the present invention will become apparent from considering the following detailed description in conjunction with the drawings in which:

FIG. 1 is a perspective view of a container assembly for electrical components embodying the present invention;

FIG. 2 is a cross sectional view taken along line 2—2 of FIG. 1;

FIG. 3 is an end view of a plurality of container assemblies of the type shown in FIG. 1 clustered together on a cluster mounting bracket;

FIG. 4 is a cross sectional view taken along line 4—4 of FIG. 2 but with the wire guard of FIG. 2 completely removed;

FIG. 5 is a top plan view of one of the cases of the container assembly shown in FIG. 1;

FIG. 6 is a cross sectional view of a container assembly similar to that shown in FIG. 2 and illustrating the detachability of the wire guard and the mounting track from an electrical component case;

FIG. 7 is an enlarged cross sectional view of the mounting track used with the container assembly shown in FIG. 1; and FIG. 8 is a cross sectional view of the wire guard of the container assembly shown in FIG. 1.

Referring now more specifically to FIG. 1 of the drawings, an electrical component container assembly which embodies the present invention is there shown and indicated generally by the reference numeral 20. The container assembly 20 can be utilized with various electrical components, such as load coils, build out capacitors, lattice networks or the like, and includes a plurality of individual, side-by-side receptacles or cases 22–27 of generally similar, substantially cylindrical configuration, a mounting track or guide 30 extending along the side-by-side receptacles 22–27, and a wire guard or protector 32 spaced from the mounting track 30 and also extending along the side-by-side receptacles 22–27. When any one or more of the cases 22–27 is properly inserted into the mounting track 30 and the wire guard 32 is positioned over the inserted cases 22–27, the container assembly 20 is mounted in a buried cable terminal housing or the like by a plurality of spaced apart mounting studs or bolts, two of which are indicated by the numerals 34 and 36.

As illustrated in connection with the case 22 and with specific reference to FIGS. 1, 2, 4 and 5, each of the cases 22–27 has a body portion 38 which, in the disclosed embodiment, is generally cylindrical in shape and is made of plastic. As is best shown in FIG. 4, one end 40 of the body portion 38 is substantially open and another end 42 is substantially closed. Along the longitudinal axis of the body portion 38, a hub or tube 44 extends from a hole 46 located centrally in the closed end 42. As is shown in FIGS. 2 and 4, a number of parallel, equally spaced ribs 48–51 extend along the interior of a wall or cylinder 52 of the body portion 38 and together with the hub 44 facilitate the installation of electrical components, such as load coils or the like in the body portion 38. These electrical components, once installed can be encapsulated within the body portion 38 by appropriate encapsulating methods known in the art.

Extending generally radially out or away from an outer wall or periphery 54 of the body portion 38 and longitudinally along at least a portion of the outer periphery 54 are a pair of spaced apart deflectable, L-shaped legs 56 and 58. The legs 56 and 58 have rounded end portions 60 and 62, respectively, extending away from each other to fit into opposed guide tracks or rails of the mounting track or guide 30.

More specifically and as is best shown in FIG. 7, the mounting track 30 is generally rectangular in shape or cross section with an upper channel or slot 63. The slot 63 includes a pair of recesses 64 and 65 formed by a middle or support wall or section 66 and generally L-shaped upper sides 68 and 69. The slot 63 also includes an opening 70 formed between the sides 68 and 69. A lower channel or slot 71 of the mounting track 30 includes recesses 72 and 73 formed by the middle section 66 and a pair of L-shaped lower sides 74 and 76. The slot 71 also has an opening 78, smaller than the opening 70, formed between the sides 74 and 76.

In order to mount the case 22 on the mounting track 30, the end portions 60 and 62 are slid into the recesses 64 and 65, respectively, with the legs 56 and 58 extending through the opening 70. Thereafter, additional cases 23–27 are sequentially placed into the upper channel 63 of the mounting track 30 and moved into side-by-side position with the other cases. Of course, because of the symmetry of both the track 30 and the legs 56 and 58 together with the end portions 60 and 62, either of the end portions 60 and 62 can be placed into either of the recesses 64 or 65 whenever mounting the case 22 on the track 30.

Advantageously, the legs 56 and 58 of the case 22 not only slide into the channel 63 of the mounting track 30, but also snap into the channel 63 so that any one of the cases 22–27 can be removed from the mounting track 30 without disturbing the other cases. A new case can then be installed in the space that was created by removal of one of the cases.

As illustrated in FIG. 6, the legs 56 and 58 have a certain amount of flexibility so that by placing sufficient force against the body portion 38, one of the deflectable legs, for example, the leg 56, and particularly its end portion 60, snaps out of the recess 64 allowing the leg 56 including the end portion 60 to be removed from the channel 63 through the opening 70. Thereafter, the other end portion 62 is removed from the recess 65, and the leg 58 is moved through the opening 70. Similarly, the deflectable end portion 62 can be first snapped from the recess 65 so as to remove the legs 56 and 58 from the channel 63. Thus, whenever one of the cases 22–27, such as the case 22, needs to be removed from the mounting track 30, the leg 56 or 58 can be snapped out of engagement with the track 30, and the case 22 can be removed from the track 30 without disturbing the remaining cases 23–27 located along the track 30.

A pair of generally rounded elongated projections 80 and 82 extend parallel to each other and longitudinally along a portion of the outer periphery 54 of the body portion 38. Between the projections 80 and 82 are disposed four holes or recesses 83–86 (FIG. 5) in the body portion 38 near the open end 40 so as to accommodate leads 87 to 90 (shown in FIG. 1), respectively, which connect to the electrical component or components in the case 22. In the disclosed embodiment, the projections 80 and 82 and the recesses 83–86 therebetween are not disposed on the outer periphery 54 of the case 22 diametrically opposite from the legs 56 and 58. Instead, the projections 80 and 82 are offset from such a position so that the leads 87–90 project from the body portion 38 at an acute angle from the legs 56 and 58. Of course, the projections 80 and 82 may be disposed diametrically opposite the legs 56 and 58 so that the leads 87–90 project from the body portion 38 directly away from the mounting track 30.

Since the cases 22–27 are not placed into any case or container, the outer periphery 54 can be easily grasped by a person installing or removing the cases 22–27. Accordingly, there is little danger that the leads 87–90 will be pulled or damaged when the case 22 is being installed in or removed from the track 30.

The wire guard 32 that protects the leads 87–90 and the leads from the other cases 23 to 27, generally indicated in FIG. 1 as a group as 92, is detachably mountable on the projection 80 and 82. To this end, as is shown in FIG. 8, the wire guard 32 has a generally channel-shaped central section 94 and a pair of diverging, deflectable side sections 96 and 98 depending outwardly therefrom. The side section 96 has a curved lower portion 100 that forms a recess or notch 102, and the side section 98 has a curved lower portion 104 that forms a recess or notch 106. When the wire guard 32 is slid into its assembled position, the projection 80 readily fits within the recess 102, and the projection 82 fits within the recess 106. Thus, after the cases 22–27 have been mounted on the mounting track 30, the wire guard 32 can be slid into position over the projections 80 and 82 so that the leads 92 and 87–90 fit within and are protected by the wire guard 32.

Moreover, since each of the cases 22–27 can be individually installed on or removed from the mounting track 30 by snapping the legs 56 and 58 into or out of engagement in the channel 63, the wire guard 32 does not have to be slid away from all of the cases 22–27. For example, if the case 22 is to be removed from the mounting track 30, the wire guard 32 merely has to be slid away from the case 22, as shown in FIG. 1. Thereafter, the case 22 can be snapped out of engagement from the mounting track 30, and after the leads 87–90 are uncoupled from the transmission line, the case 22 can be removed from the container assembly 20.

In many instances, it is inconvenient to slide the wire guard 32 away from or onto the cases 22–27 (i.e., the ends of the container assembly may be obstructed so that a relatively long wire guard 32 cannot be slid onto or off of the assembly 20). Advantageously, and as illustrated in FIG. 6, the curved portion 100 can be deflected and snapped onto or disengaged from the projection 80 by applying a suitable amount of force to one side of the central section 94 of the wire guard 32. Similarly, the curved portion 104 can be deflected and snapped onto or disengaged from the projection 82 by applying an appropriate amount of force to the other side of the central section 94.

As was previously mentioned, each of the cases 22–27 includes a substantially closed end 42 and a substantially open end 40. When installed in the container assembly 20, the closed end 42 of one of the cases, such as the case 23, is mounted next to the open end 40 of the adjacent case 24. In order to close or seal the open end 40 of the cases 22–27, a cover, such as the cover 110 associated with the cases 22, is insertable into the open end 40 and substantially covers the open end 40 so as to protect the electrical components within the cases 22–27.

Once the cases 22–27 have been mounted on the track 30 and the wire guard 32 disposed over the leads 87–90 and 92, the mounting studs 34 and 36 are positioned in the channel 71 of the mounting track 30. As shown with respect to the stud 36 in FIG. 2, each of the studs 34 and 36 has an upper disk-shaped or other suitably shaped head 112 which slidably fits within the recesses 72 and 73 of the channel 71. The stud 36 also has a threaded shank portion 113 that extends from the head 112 through the opening 78 so that the stud 36 can be positioned anywhere along the mounting track 30. When the stud 36 is properly positioned along the track 30 so as to be mounted in a cable terminal housing or the like, the stud 36 is secured in place by a nut 114.

In some circumstances, it is desirable to mount a group or plurality of container assemblies 20 on a cluster mounting bracket. As shown in FIG. 3, three container assemblies 116, 118, and 120, each of which assemblies is similar to the container assembly 20, are mounted on a single cluster bracket 122. The cluster bracket 122 has a central stem 124 forming a lower, rectangular channel 126 to receive a disk-shaped head 128 of one or more mounting studs 130, each of which is similar to the mounting stud 34 or 36 previously described. Extending from the central stem 124 of the bracket 122 are three projections 132, 134, and 136. The projections 132, 134, and 136 are generally T-shaped with the top of the T portions 138, 140, and 142, respectively, being slidably insertable within mounting tracks 144, 146, and 148. Advantageously, each of the mounting tracks 144, 146, and 148 is the same as the mounting track 30 shown in connection with the container assembly 20. Accordingly, the same mounting track 30 can be utilized when installing a single container assembly 20 or a plurality of assemblies 116, 118, and 120.

Although the present invention is described with reference to a single illustrative embodiment thereof, it should be understood that numerous other modifications and embodiments of the invention can be devised by those skilled in the art that will fall within the spirit and scope of the principles of this invention.

What is claimed and desired to be secured by Letters Patent of the United States is:

1. A container assembly having load coils, build out capacitors, or lattice networks, each of which has at least one conductor, said container assembly comprising:
    a mounting track having a channel means, and
    a plurality of individual cases in each of which at least one of said load coils, build out capacitors, or lattice networks is encased and out of each of which said conductor extends, each of said cases having leg means cooperating with said channel means detachably securing each case to said mounting track.

2. A container assembly as set forth in claim 1 wherein said leg means have deflectable portions which snap into said channel means to permit each case to be attached to or removed from said track by deflecting said portions.

3. A container assembly as set forth in claim 1 wherein each of said cases has a body portion generally cylindrical in shape and said leg means extend radially away from the outside wall of said cylindrical body portion.

4. The container assembly as set forth in claim 1 wherein each of said cases has a longitudinal axis along the channel means and said assembly includes
    projection means extending along said longitudinal axis on a portion of the outer periphery of each of said cases, said projection means being positioned on both sides of the conductor extending out of each of said cases, and
    a wire guard detachably mounted on said projection means covering said conductor.

5. A container assembly having electrical components, each of which electrical components has a plurality of electrical leads, said assembly comprising:
    a plurality of individual cases, each of which cases contains at least one of said electrical components and has a plurality of access means through which access means said leads are extended,
    an elongated mounting track having a first channel portion with first and second elongated recesses,
    leg means extending along a portion of and away from an outer periphery of each of said cases, said leg means having first and second end means detachably mounted in said first and second recesses, respectively,
    first and second spaced apart projections extending longitudinally along a portion of the outer periphery of each of said cases, and
    a wire guard detachably mounted on said first and second projections.

6. The container assembly as set forth in claim 5 wherein said first end means extends generally transverse to said leg means, is generally rounded in shape, and is mountable into said first recess, and said second end means extends generally transverse to said leg means, is generally rounded in shape, and mountable into said second recess by snapping said second end means into said second recess.

7. The container assembly as set forth in claim 5 wherein said mounting track has a second channel portion, and
    fastening means insertable into said second channel portion of said mounting track.

8. The container assembly as set forth in claim 5 wherein said first channel portion has an opening through which said leg means is extendable and said first and second end means are slidable within said first and second recesses.

9. A mounting assembly having electrical components, each of which components has a plurality of leads, said assembly comprising:
- a plurality of groups of individual cases, each of said cases containing at least one of said components,
- a plurality of mounting tracks, each of said tracks being associated with one of said groups of said cases and each of said tracks having a first channel and a second channel,
- first and second leg means extending from each of said cases, said first and second leg means being detachably received in said channel of each of said mounting tracks,
- a cluster mounting bracket having a plurality of T-shaped portions, each of which T-shaped portions is received in one of said second channels of, and
- fastening means secured to said cluster mounting bracket for mounting said mounting bracket to a support.

10. An assembly having a plurality of electrical components, each of said electrical components having leads connected thereto, said assembly comprising:
- a plurality of side-by-side cases, each of which cases contains one of said electrical components and has access means through which said leads extend,
- projections on the exterior of each case and longitudinally aligned along said assembly, said projections being positioned on both sides of said access means,
- a wire guard detachably secured said projections to covering said leads,
- mounting legs formed on the exterior of each of said cases and longitudinally aligned along the assembly, and
- a guide track cooperating with said mounting legs supporting the cases in side-by-side relationship.

11. The assembly as set forth in claim 10 wherein said mounting legs are deflectable so that each of said cases is detachable from said guide track without removing any of the other cases.

12. The container assembly as set forth in claim 3 wherein said case has at least one hole in said body portion through which said conductor extends, said hole being offset from a position diametrically opposite of said leg means.

13. The container assembly as set forth in claim 5 wherein said mounting guide has a second channel means formed by said support wall and a pair of L-shaped second side walls extending away from said first side walls and a mounting means slidably insertable into said second channel means.

14. A container assembly having electrical components comprising:
- a generally elongated mounting guide having a first channel means formed by a support wall and a pair of first generally L-shaped side walls extending from said support wall such that a pair of first recesses is formed by said support wall and said first side walls and a first opening is formed between said side walls, and
- means containing said electrical components, said receptacle means having a body portion and leg means extending outwardly from the body portion, said leg means fits into said first recesses and against said support wall to permit sliding movement of said receptacle along said guide and said leg means cooperating with said mounting guide to permit removal of said leg means from said first recesses, whereby said receptacle means may be detached from said mounting guide.

15. A container assembly having electrical components comprising:
- means containing receptacle the electrical components, said receptacle means having a body portion and leg means extending outwardly from the body portion, said body portion having one end substantially open and another end substantially closed and having a plurality of openings in the outer periphery at the open end,
- a mounting guide cooperating with said leg means to support said and supporting said receptacle means, said mounting guide being generally elongated and having a first channel means formed by a support wall and a pair of first generally L-shaped side walls extending from said support wall such that a pair of first recesses and a first opening are formed by said support wall and said first side walls,
- projection means extending longitudinally along a portion of the exterior of the body portion of the receptacle means, said projection means being adjacent said openings,
- a wire guard detachably mounted on said projection means,
- wire leads from said electrical components extending from said openings, and
- a cover substantially enclosing said open end of said body portion.

16. A container assembly having electrical components comprising:
- a mounting guide having a pair of side walls along its elongated axis, which side walls have projections thereon, and which are interconnected by a support wall such that along said elongated axis a pair of recesses are formed between said support wall and said side walls and an opening is formed between said side walls, and
- case means enclosing said electrical components, said case means having leg means fitting through said opening and into said pair of recesses and abutting against said support wall to permit sliding movement along said guide and cooperate with said mounting guide to permit removal of said leg means from said recesses.

17. A container assembly having electrical components comprising:
- receptacle means containing the electrical components, said receptacle means having a body portion with leg means,
- a mounting guide cooperating with said leg means and supporting said receptacle means, said mounting guide being generally elongated and having channel means formed by a support means and first and second side walls having projections thereon such that a first recess is formed between said first side wall and said support means and a second recess is formed between said second side wall and said support means and,
- said leg means extending away from said body portion and having first and second end portions that are detachably mounted in said first and second recesses, respectively, such that said first and second end portions abut against said support means to support said receptacle on said mounting guide.

18. The container assembly as set forth in claim 14 wherein said leg means includes first and second leg portions having first and second end portions, respectively, insertable into said first recesses, said first and second leg portions being deflectable so that said receptacle means is detachably mounted on said mounting guide.

19. The container assembly as set forth in claim 5 wherein said first end means has a first round end portion which extends into said first recess and said second end means has a second round end portion which extends in a direction opposite of the direction of said first round end portion and which extends into said second recess.

20. The container assembly as set forth in claim 5 wherein said leg means includes first and second deflectable portions.

* * * * *